United States Patent [19]

Schulte

[11] 4,114,748
[45] Sep. 19, 1978

[54] SILAGE DOOR GUIDE
[76] Inventor: Theodore B. Schulte, R.R., Dorchester, Iowa 52140
[21] Appl. No.: 831,231
[22] Filed: Sep. 7, 1977
[51] Int. Cl.² .......................................... B65G 11/18
[52] U.S. Cl. ...................................... 193/33; 302/56
[58] Field of Search .................. 214/17 DB; 302/56; 193/33, 34, 17; 198/640, 641

[56] References Cited
U.S. PATENT DOCUMENTS 3,462,199  8/1969  Harris et al. ........................... 302/56
3,539,059  11/1970 Buschbom ....................... 214/17 DB Primary Examiner—Robert G. Sheridan
Attorney, Agent, or Firm—John N. Randolph

[57] ABSTRACT

A silage door guide, constituting an attachment for a silo unloader, having an outer end which is detachably connected to a frame member constituting a cross piece above a silo door or opening, and which hingedly supports an outer end of an invertedtrough-shaped member an intermediate part of which slidably engages on the outer end of the discharge spout of the silo unloader, for directing the silage being blown from said discharge end outwardly through the silo door.

6 Claims, 2 Drawing Figures

U.S. Patent  Sept. 19, 1978  4,114,748

SILAGE DOOR GUIDE

SUMMARY

It is a primary object of the present invention to provide a silage guide forming an attachment for the discharge end of a conventional silo unloader discharge spout which will prevent the discharged silage from dropping and spreading before it reaches the silo door or from missing said door or opening.

Another object of the invention is to provide a silage guide which will increase the capacity of the silo unloader by making it unnecessary for the unloader to handle the same silage more than once, due to failure of the silage to be discharged from the unloader spout through the silo door or opening.

Still another object of the invention is to provide a guide which will function to maintain the air pressure from the silo blower confined in the guide to insure that the silage will be blown through the silo door or opening and not fall back into the silo after leaving the discharge spout, with a resulting buildup of silage around the unloader blower, tending to cause incorrect operation of the blower.

Various other objects and advantages of the invention will hereinafter become more fully apparent from the following description of the drawing, illustrating a presently preferred embodiment thereof, and wherein:

DESCRIPTION OF THE PREFERRED EMBODIMENT

Figure 1:
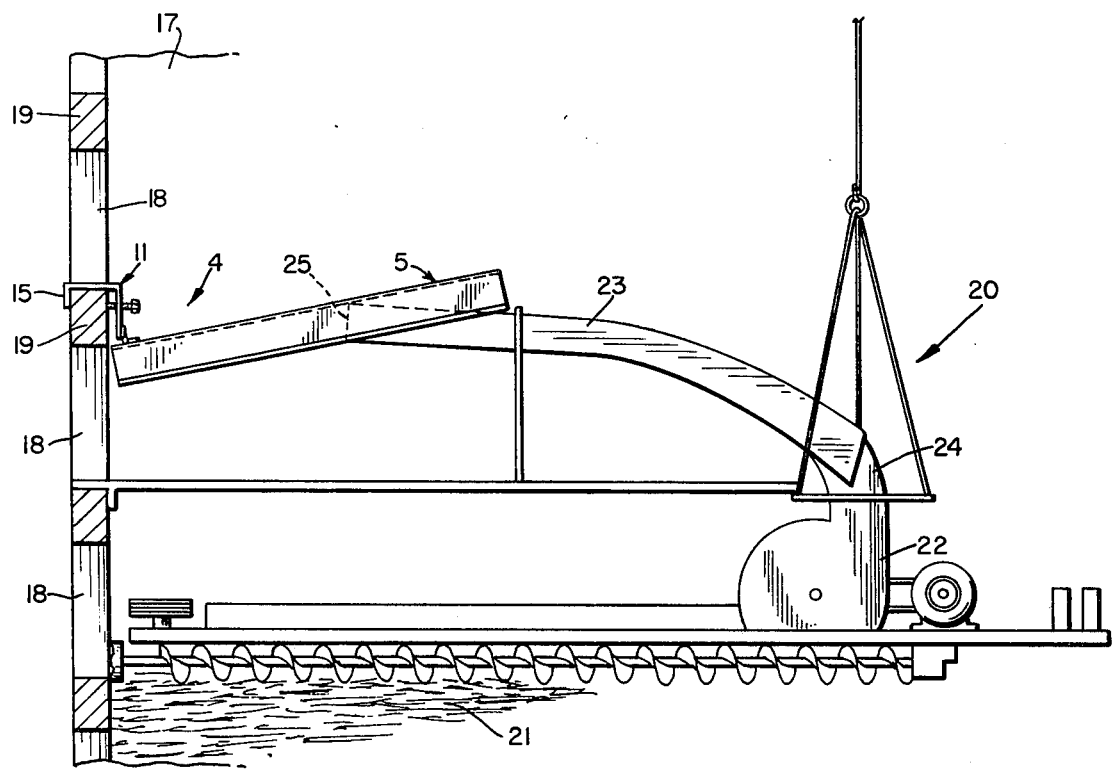
FIG. 1 is a fragmentary vertical sectional view of a portion of a silo, showing a conventional silo unloader disposed therein, and showing the silage unloader guide, constituting the present invention, associated with the discharge spout of the unloader.
Figure 2:
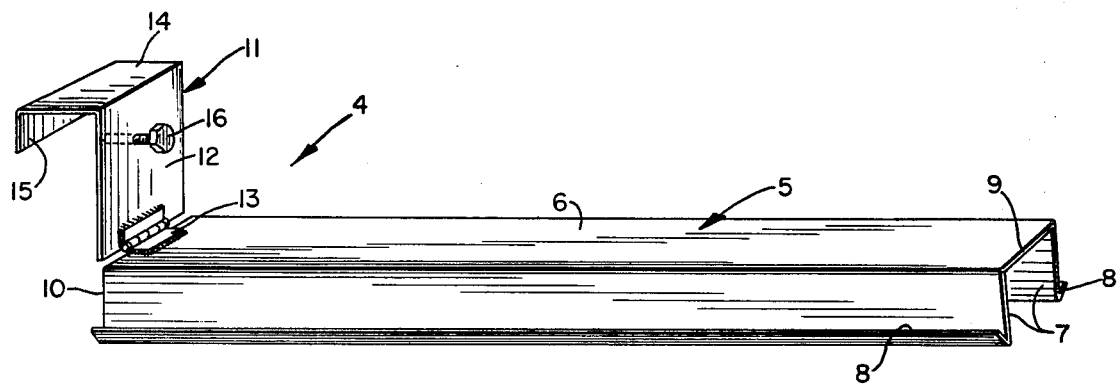
FIG. 2 is an enlarged perspective view of the silage door guide.

Referring more specifically to the drawing, the silage door guide in its entirety and comprising the invention is designated generally 4 and includes an elongated inverted trough or channel-shaped guide member 5 having a top wall 6 and corresponding side walls 7 which are disposed substantially parallel to one another. The bottom edges of the side walls 7 are preferably turned outwardly and upwardly to provide reinforcing lips 8 which assist in retaining the walls 7 in substantially parallel relation to one another and to provide smooth rounded bottom edges for said walls. The guide member 5 has an open inner end 9 and an open outer discharge end 10.

The guide 4 includes a hook or hanger member 11 which is preferably of substantially the same width as the guide member 5 and which includes a shank portion 12 having a lower end which is connected by a hinge 13 to the top wall 6 near the open end 10, for swinging movement about an axis disposed crosswise of the longitudinal axis of said guide member 5. Shank 12 terminates at its upper end and in an outturned top portion 14 which has at its outer edge a downturned bill portion 15. A screw 16 extends threadedly through the shank 12, near its upper end.

A portion of a conventional silo 17 is shown in FIG. 1. The wall of the silo 17 has vertically spaced openings or doors 18 separated by wall portions 19 which are disposed over said doors or openings. A silo unloader 20 of the suspended type is shown diagrammatically in the silo 17 for conveying silage 21 from beneath said unloader 20 to its blower 22 and then through the discharge spout 23 of the unloader which connects with the blower outlet 24. As seen in FIG. 1, the outlet end of the discharge spout 23 is spaced a substantial distance from the silo doors or openings 18 so that a substantial portion of the silage discharged therefrom will not pass outwardly through one of the openings 18 but will fall back into the silo.

The hook member 11 is hooked over one of the door frames 19, so that the shank 12 and bolt 16 are disposed inside of the silo 17, with the bill portion 15 engaging against the outer side of the frame 19. The screw 16 is then advanced toward the bill portion 15 for clamping the hook 11 to the member 19. Accordingly the guide member 5 is thus pivotally supported at its outer end 10 for vertical swinging movement and extends inwardly in overlapping relation to the discharge spout 23, so that an intermediate portion of the top wall 6 thereof rests upon the discharge end 25 of the spout 23.

Consequently, the guide member 5 will slide back and forth on the discharge end 25 of the spout 23 as the silo unloader 20 revolves around the silo 17 and as the silage 21 is unloaded and the unloader descends in the silo.

Various modifications and changes are contemplated and may be resorted to, without departing from the function or scope of the invention.

I claim as my invention:

1. For use in a silo having a plurality of vertically spaced openings separated by wall portions, a silage unloader having a discharge spout operatively associated therewith, an elongated inverted channel-shaped member having an intermediate portion resting on the discharge end of the spout to enable free sliding and pivoting movement of said member relative to the spout, said member having an outer end spaced outwardly from the discharge spout, and a hanger connected to and extending upwardly from said member, outwardly of said intermediate portion, and detachably engaging over one of said wall portions for supporting said outer end of the member adjacent to and in alignment with one of said openings of the silo, said hanger and spout providing the sole support from said member.

2. A device as in claim 1, means pivotally connecting said hanger to the inverted channel-shaped member.

3. A device as in claim 2, and means detachably clamping said hanger to the silo.

4. A device as in claim 2, said hanger comprising a hook-shaped member.

5. A device as in claim 1, said inverted channel-shaped member having a substantially flat top wall and depending substantially parallel side walls.

6. A device as in claim 5, said side walls having outwardly turned back bottom edges defining lips extending from end-to-end thereof.

* * * * *